US008100455B2

(12) United States Patent
Lee

(10) Patent No.: US 8,100,455 B2
(45) Date of Patent: Jan. 24, 2012

(54) OVERHEAD CONSOLE

(75) Inventor: Gwon Hak Lee, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 279 days.

(21) Appl. No.: 12/626,259

(22) Filed: Nov. 25, 2009

(65) Prior Publication Data

US 2010/0301625 A1 Dec. 2, 2010

(30) Foreign Application Priority Data

Jun. 1, 2009 (KR) ........................ 10-2009-0048221

(51) Int. Cl.
*B60R 7/00* (2006.01)

(52) U.S. Cl. .......................... 296/37.8; 248/478; 359/838

(58) Field of Classification Search ................. 296/37.8, 296/39.1, 37.7, 24.34; 359/838, 841, 844, 359/872, 881; 248/478
See application file for complete search history.

(56) References Cited

U.S. PATENT DOCUMENTS

| 5,822,023 | A | * | 10/1998 | Suman et al. | ................. | 348/837 |
| 6,116,675 | A | * | 9/2000 | Iwasawa | ........................ | 296/37.8 |
| 6,135,528 | A | * | 10/2000 | Sobieski et al. | ............. | 296/37.7 |
| 7,363,148 | B1 | * | 4/2008 | Laverick et al. | ............... | 701/200 |
| 7,686,464 | B2 | * | 3/2010 | Compton et al. | ............. | 359/866 |
| 2007/0091215 | A1 | * | 4/2007 | Ikunami | ........................ | 348/837 |
| 2007/0171316 | A1 | * | 7/2007 | Mathias et al. | ............... | 348/837 |
| 2008/0122239 | A1 | | 5/2008 | May et al. | | |
| 2008/0252090 | A1 | * | 10/2008 | Tiesler et al. | ................. | 296/37.7 |

FOREIGN PATENT DOCUMENTS

| JP | 2006-142892 A | 6/2006 |
| KR | 10-0831031 B1 | 5/2008 |
| KR | 10-0867255 B1 | 11/2008 |

\* cited by examiner

*Primary Examiner* — Glenn Dayoan
*Assistant Examiner* — Pinel Romain
(74) *Attorney, Agent, or Firm* — Morgan, Lewis & Bockius LLP

(57) ABSTRACT

An overhead console may include a conversation mirror having a fitting protrusion formed on one end thereof, a housing having adjoining main and auxiliary spaces defined therein, wherein the auxiliary space releasably stores the conversation mirror, a cover pivotally coupled to the housing to open or close the main space, wherein the cover has a bucket to be selectively engaged to the main space, a latch part provided in an upper portion of the auxiliary space, wherein the fitting protrusion of the conversation mirror is fastened into or unfastened from the latch part so that the conversation mirror is stored inside or released from the auxiliary space, and an elastic member fixing the auxiliary space and the conversation mirror, wherein the elastic member applies an elastic force in a direction to release the conversation mirror from the auxiliary space.

5 Claims, 7 Drawing Sheets

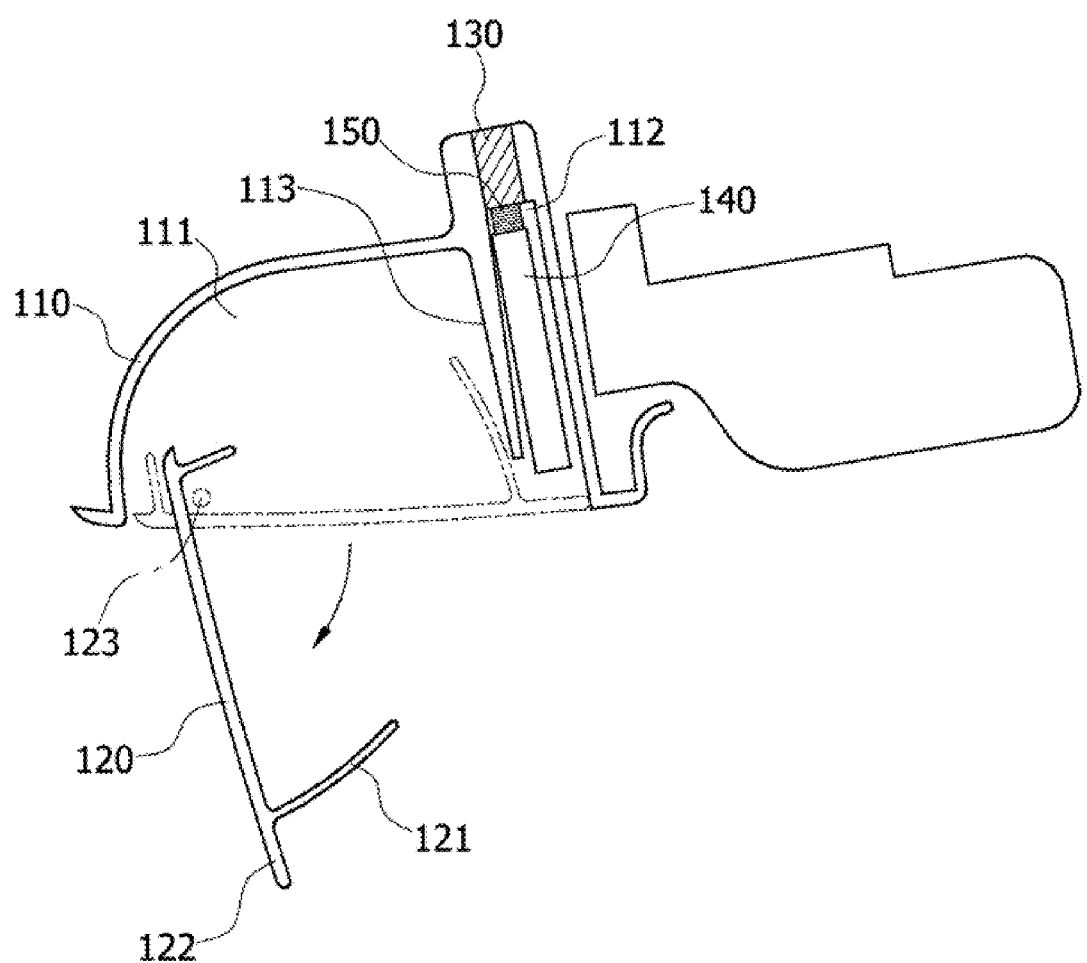

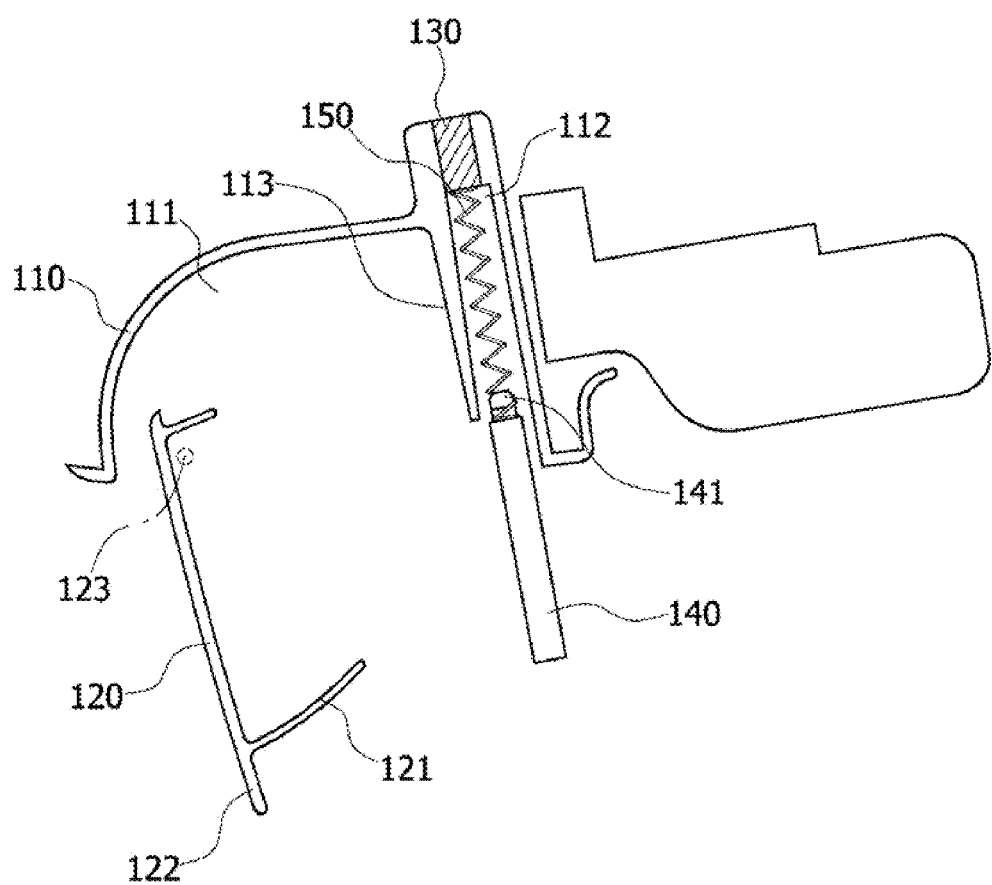

OVERHEAD CONSOLE

CROSS REFERENCE TO RELATED APPLICATION

The present application claims priority to Korean Patent Application Number 10-2009-0048221 filed on Jun. 1, 2009, the entire contents of which application is incorporated herein for all purposes by this reference.

BACKGROUND OF THE INVENTION

1. Field of the Invention

The present invention relates to an overhead console, and more particularly, to an overhead console which can utilize a limited space by installing a conversation mirror, which provides a view of a rear vehicle or a backseat passenger, inside a storage space for sunglasses.

2. Description of Related Art

In general, a rear-view mirror is provided on the front portion of the interior roof of a vehicle, between the driver's seat and the seat next to the driver, and an overhead console is provided in front of the rear-view mirror on the interior roof. Adjacent to the overhead console, a conversation mirror is installed in the interior roof so that a driver can talk with rear seat passengers while seeing their faces or easily monitor the rear seat passengers.

Below, a conventional overhead console will be described with an accompanying drawing.

FIG. 1 is a perspective view illustrating a conventional overhead console.

The conventional overhead console 10 is provided on the front portion of the interior roof of a vehicle, between the driver's seat and the seat next to the driver. The overhead console 10 includes lamps 11 lighting the driver's seat and the seat next to the driver, a sunglasses case 12 storing sunglasses or glasses, and a conversation mirror 13. The overhead console 10 also has a cavity 14, in which the conversation mirror 13 is pivotally installed, and a pivot means 15 capable of rotating the conversation mirror 13 is provided on one side of the conversation mirror 13.

However, in the conventional overhead console, the cavity additionally provided for the conversation mirror and the pivotally-installed conversation mirror occupy a large space. Accordingly, the conventional overhead console is unsuitable for a small vehicle due to size constraints.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention provide an overhead console in which a conversation mirror can be installed in a limited layout and be taken out by a simple operation due to a vertically movable structure.

In an aspect of the present invention, the overhead console provided on a front portion of an interior roof of a vehicle between a driver's seat and a seat next to the driver's seat, may include a conversation mirror providing a view of a rear vehicle or a backseat passenger, wherein the conversation mirror has a fitting protrusion formed on one end thereof, a housing having adjoining main and auxiliary spaces defined therein, wherein the auxiliary space releasably stores the conversation minor, a cover pivotally coupled to the housing to open or close a lower portion of the main space, wherein the cover has a bucket to be selectively engaged to the main space to store sunglasses, a latch part provided in an upper portion of the auxiliary space, wherein the fitting protrusion of the conversation mirror is fastened into or unfastened from the latch part so that the conversation mirror is stored inside or released from the auxiliary space, and an elastic member having one end fixed in an upper portion of the auxiliary space and the other end thereof fixed to the conversation mirror, wherein the elastic member applies an elastic force in a direction to release the conversation mirror from the auxiliary space.

The cover may have an extension extending towards the auxiliary space so as to open and close a lower portion of the auxiliary space.

An inner surface of the extension of the cover and a lower end of the conversation mirror may be distanced from each other at a predetermined interval in a locking state so that the cover does not contact the conversation mirror when opening or closing a lower portion of the housing.

An inner surface of the extension of the cover and a lower end of the conversation mirror may contact with each other in a locking state so that the cover and the conversation mirror are released from the housing concurrently.

The conversation mirror may have protrusions formed on opposite edges thereof, respectively, and the auxiliary housing may have grooves formed in opposite sidewalls thereof, respectively, wherein each of the grooves receives a corresponding one of the protrusions and guides movement of the corresponding protrusion.

According to various aspects of the present invention, the overhead console is easily applicable to a small vehicle since the conversation mirror can move in the vertical direction. In addition, the storage space for the conversation mirror is obtained by dividing the storage space for the sunglasses rather than being separately provided. Accordingly, the storage space for the conversation mirror is not exposed outside and thus provides an aesthetic appearance.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 3B is a cross-sectional view illustrating the overhead console in accordance with one exemplary embodiment of the invention, in which the cover is used;

FIG. 3C is a cross-sectional view illustrating the overhead console in accordance with one exemplary embodiment of the invention, in which the conversation mirror is used;

Figure 1:
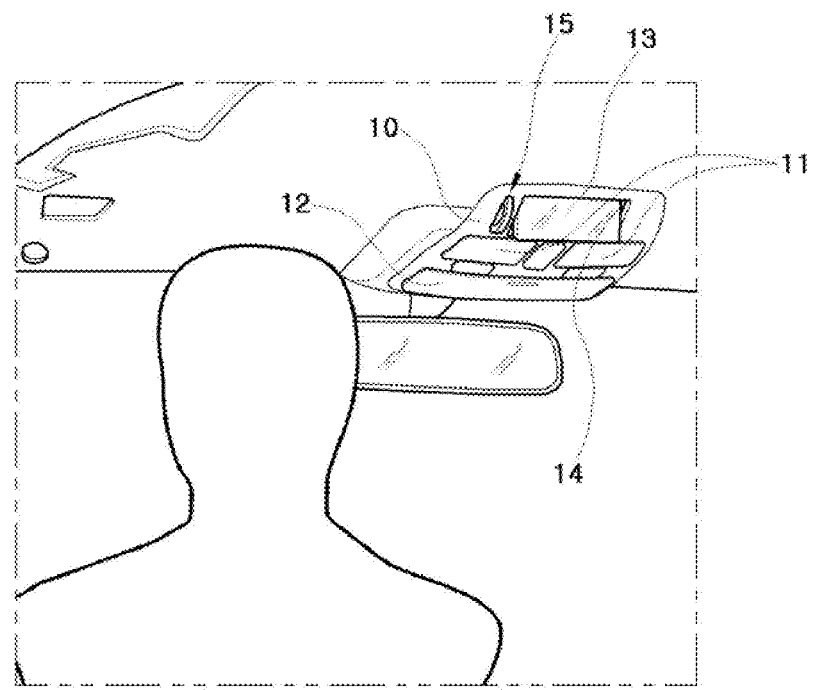
FIG. 1 is a perspective view illustrating a conventional overhead console.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 2A:
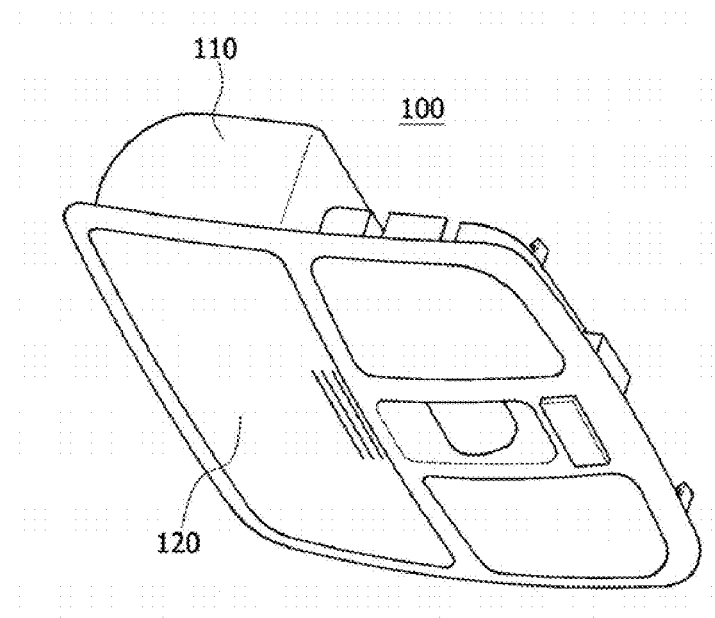
FIGS. 2A, 2B, and 2C are perspective, cross-sectional, and top plan views illustrating an overhead console in accordance with one exemplary embodiment of the invention, in which a conversation mirror is not used.
Figure 2B:
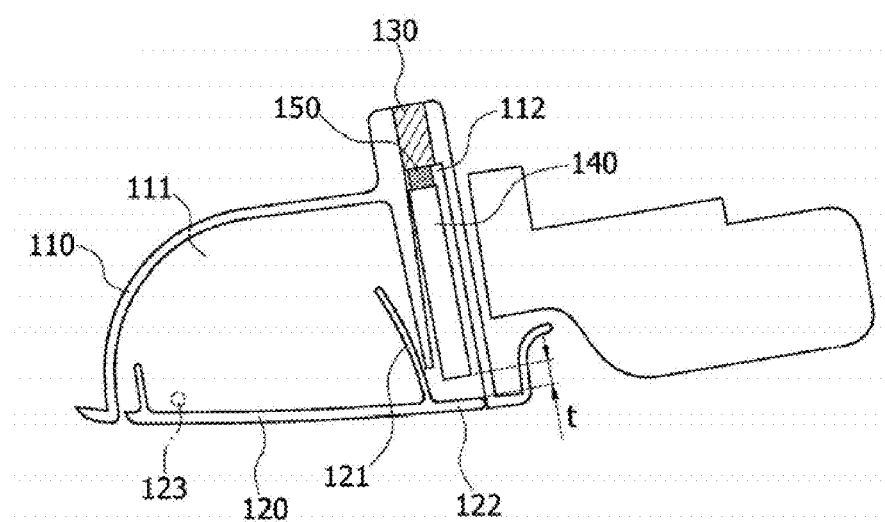
Figure 2C:
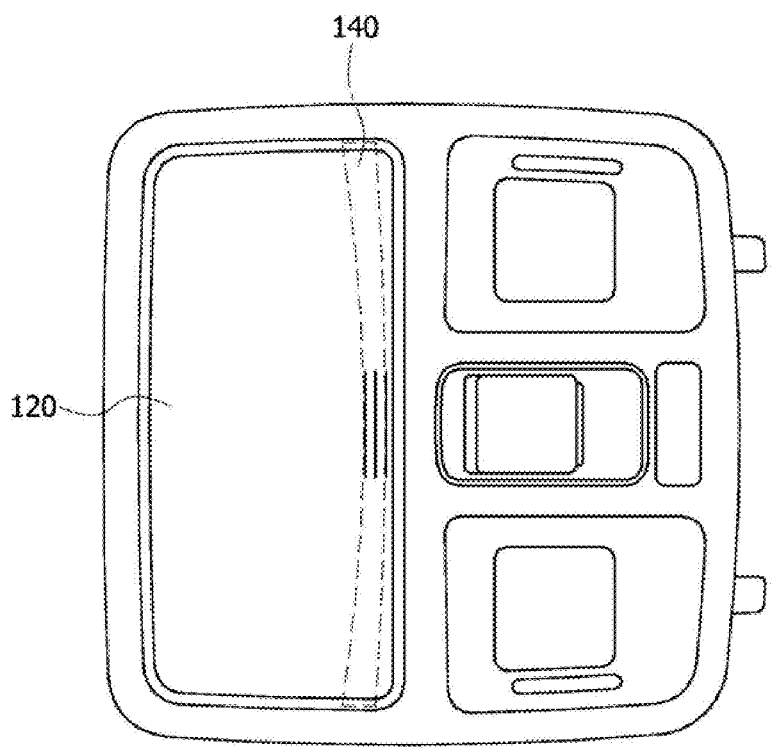
Figure 3A:
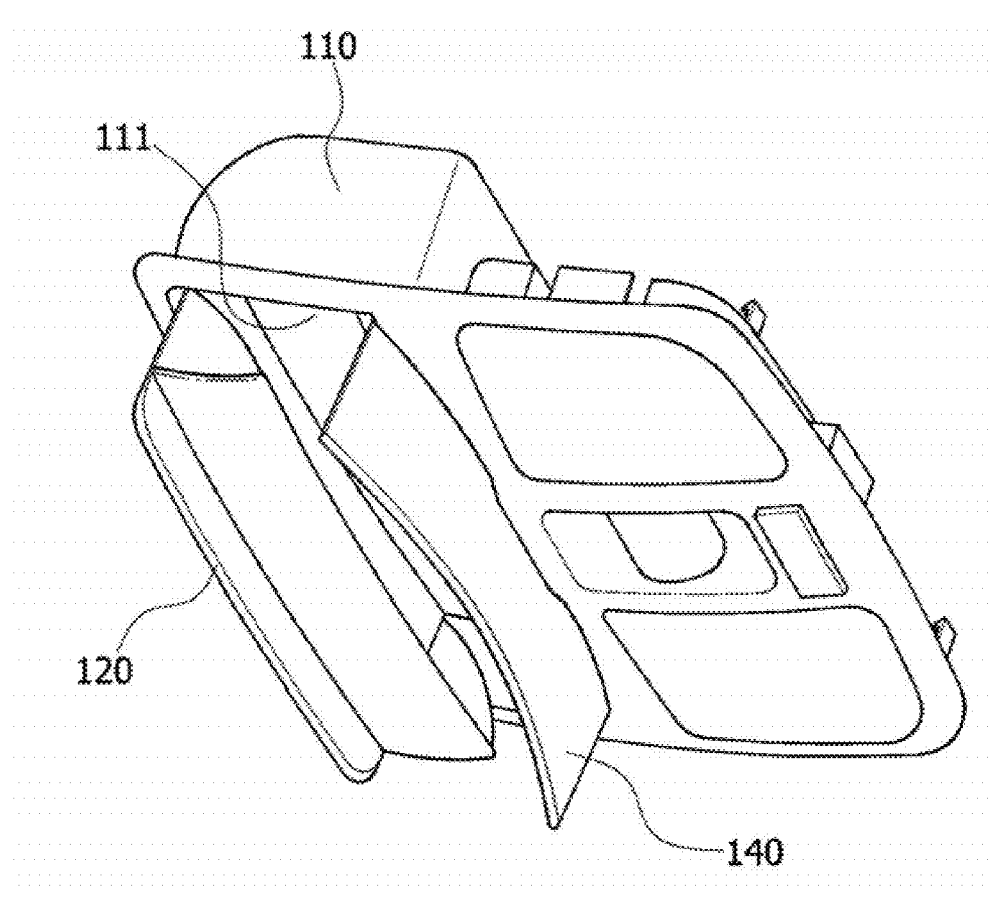
FIG. 3A is a perspective view illustrating the overhead console in accordance with one exemplary embodiment of the invention, in which the conversation mirror is used.

FIGS. 2A, 2B, and 2C are perspective, cross-sectional, and top plan views illustrating an overhead console in accordance with one exemplary embodiment of the present invention, in which a conversation mirror is not used, FIG. 3A is a perspective view illustrating the overhead console, in which the conversation mirror is used, FIG. 3B is a cross-sectional view illustrating the overhead console, in which the cover is used, and FIG. 3C is a cross-sectional view illustrating the overhead console, in which the conversation mirror is used.

The overhead console of this embodiment is provided on the front portion of the interior roof of a vehicle, between the driver's seat and the seat next to the driver, and includes a conversation mirror 140 providing a view of a rear vehicle or a backseat passenger. The overhead console also includes a housing 110, a cover 120, a latch part 130, and an elastic member 150. The interior of the housing 110 defines a main space 111 and an auxiliary space 112. The cover 120 is pivotally coupled to the housing 110 to open and close the lower portion of the housing 110 in order to store sunglasses. With the latch part 130, the conversation mirror 140 is stored inside and released from the auxiliary space 112.

The housing 110 is open at one side, and has a partition 113 dividing the interior of the housing 110 into the main space 111, and the auxiliary space 112 which stores the conversation mirror 140. The main space 111 and the auxiliary space 112 are formed inside the interior roof of the vehicle. The auxiliary space 112 has a room capable of storing the conversation mirror 140, with predetermined intervals left around the conversation mirror 140. The auxiliary space 112 serves to guide the movement of the conversation mirror 140.

The cover 120 is pivotally coupled to the housing 110 to selectively close the open side of the housing 110. The cover 120 has a bucket 121 extending from the inner side thereof so as to store the sunglasses. When the cover 120 is closed, the bucket 121 is hidden into the main space 111 of the housing 110. The bucket 121 is known in the art and serves to prevent the sunglasses in the cover 120 from dropping when the cover 120 pivots to open the housing 110.

Hinge pins 123 protrude from opposite edge portions of the cover 120, and hinge holes are formed in opposite sidewalls of the main space 111 of the housing 110, in positions corresponding to the hinge pins. The cover 120 pivots about the hinge pins 123, and in an exemplary embodiment of the present invention, a rotary oil damper can be provided in place of the hinge pins and the hinge holes in order to control the rotating speed of the cover.

In addition, a fitting protrusion can be provided on one of the opposite edge portions of the cover 120 and a latch can be provided in one sidewall of the main space 111. The fitting protrusion of the cover and the latch of the main space are configured the same as the latch part 130 and a fitting protrusion 141, which will be described later herein. The fitting protrusion and the latch can be preferably provided on one of the opposite sides of the cover and the main space. As an alternative, the fitting protrusion and the latch can be provided on both the opposite sides of the cover and the main space.

The cover 120 has an extension 122 closing the lower portion of the auxiliary space 112 of the housing 110. An aesthetic appearance can be achieved since the extension 122 hides the conversation mirror 140 from outside.

The latch part 130 is fixed in the upper portion of the auxiliary space 112. The latch part 130 serves to hold and release the conversation mirror 140 inside and from the auxiliary space 112 by fastening to and unfastening from the fitting protrusion 141, which is provided on one end of the conversation mirror 140.

Figure 4A:
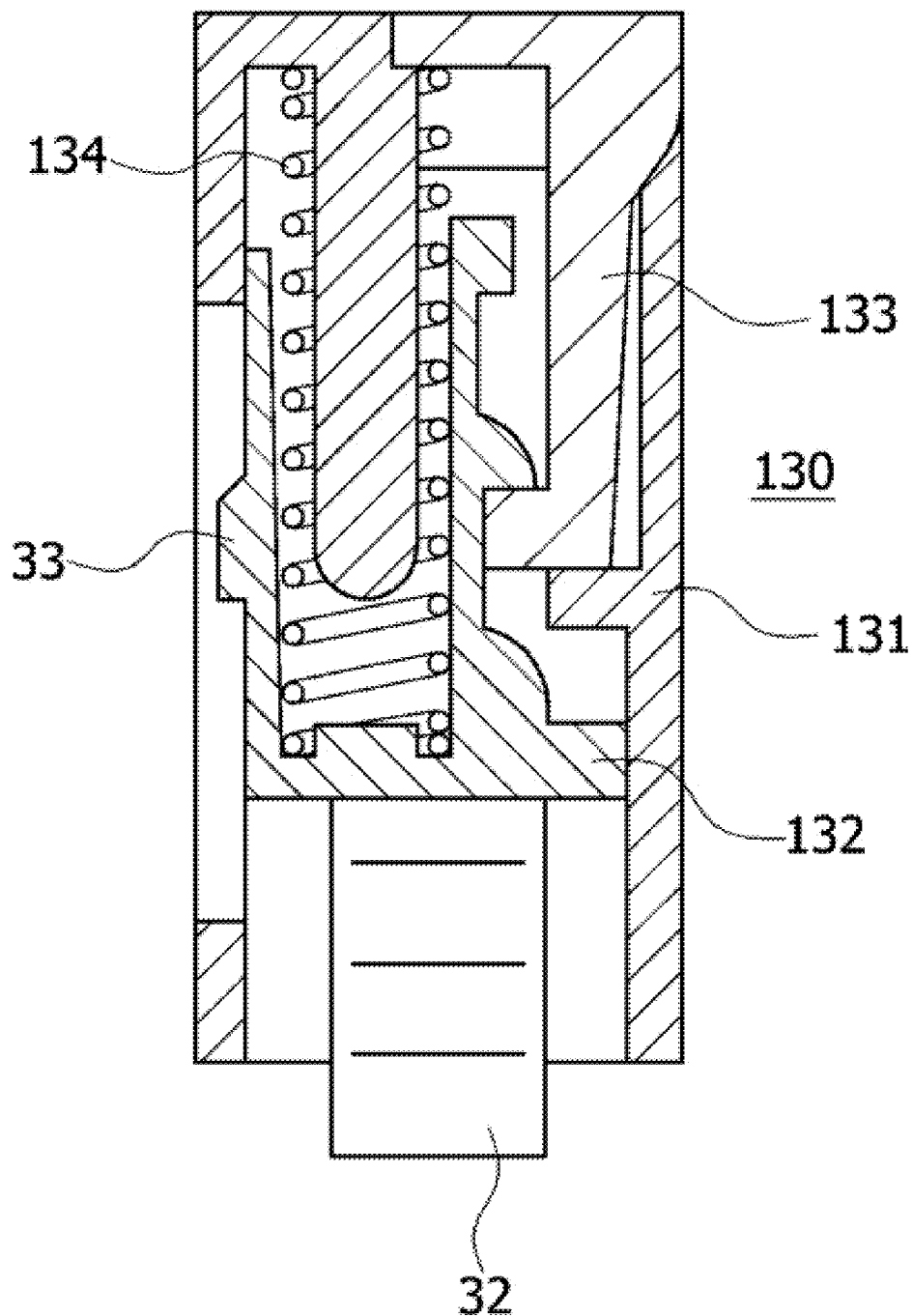
FIGS. 4A, 4B, and 4C are cross-sectional and bottom views illustrating the operational status of the latch part and the conversation mirror of the overhead console in accordance with one exemplary embodiment of the invention.
Figure 4B:
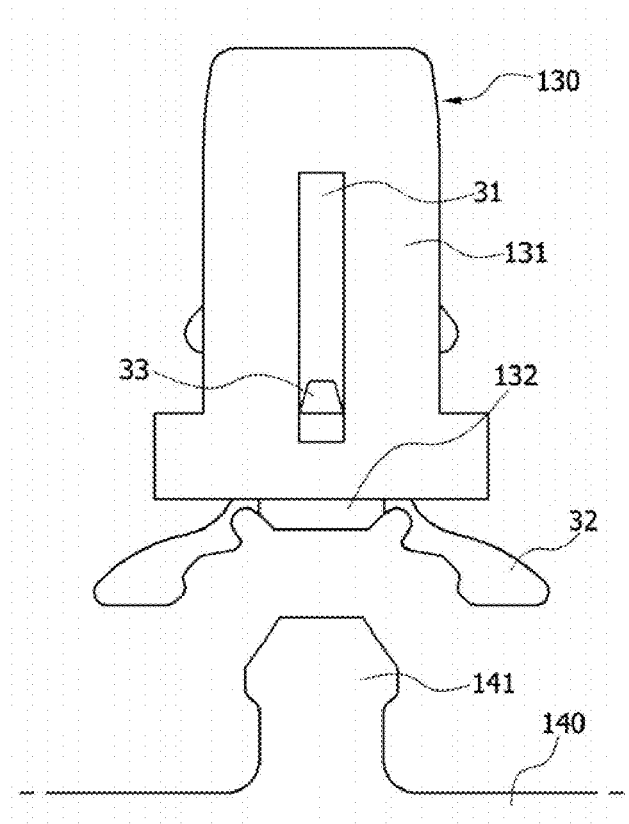
Figure 4C:
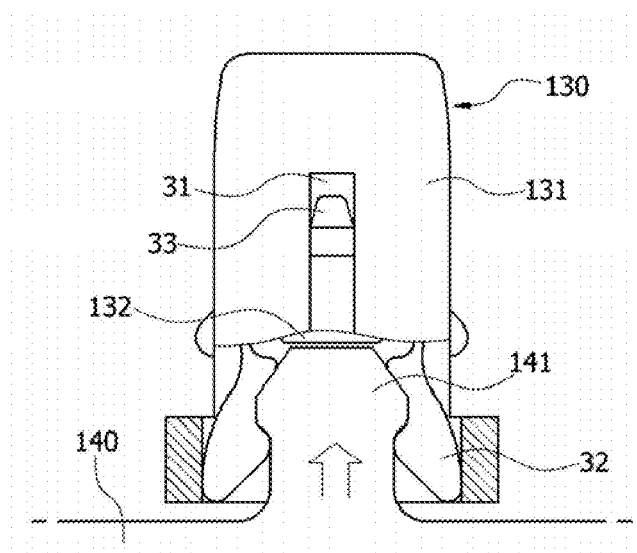

Referring to FIGS. 4A through 4C, the latch part 130 will be described more fully below. The latch part 130 is known in the art, and includes a rectangular case 131 and a hook member 132. The rectangular case 131 has an opening, and the hook member 132 is elastically supported by an elastic spring 134 inside the case 131. A holder 32 is provided on one end of the hook member 132 to hold the fitting protrusion 141, and a stopper 33 is formed on one side of the hook member 132 to slide along a slot-shaped guide 31 formed in one sidewall of the case 131. The latch part 130 also includes a lever 133 provided in the upper rear portion inside the case 131. The lever 133 controls locking of the hook member 132 while acting as a cam.

When the fitting protrusion 141 fastened into the holder 32 moves backwards into the case 131, the lever 133 fixedly locks the hook member 132 inside the case 131. At this time, when the fitting protrusion 141 is pressed backwards into the case 131, the hook member 132 is pushed out of the case 131 so that the fitting protrusion 141 is unfastened from the holder 32.

The latch part 130 allows the conversation mirror 140 to be stored inside and released from a fixed state in response to an action pressing the conversation mirror 140 in one direction.

One end of the elastic member 150 is fixed to the upper portion of the auxiliary space 112 and the other end of the elastic member 150 is fixed to the upper end of the conversation mirror 140. The elastic member 150 applies an elastic force to the conversation mirror 140 such that the conversation mirror 140 moves out from the auxiliary space 112. In the state where the fitting protrusion 141 of the conversation mirror 140 is fastened into the latch part 130, the elastic member 150 maintains a compressed state. When the fitting protrusion 141 is unfastened from the latch part 130, the elastic member 150 rebounds from the compressed state so that the conversation mirror 140 moves out of the auxiliary space 112. As an alternative, the elastic member 150 can be fixed at one end to the latch part 130 and at the other end to the conversation mirror 140.

In order to limit the range of exposure of the conversation mirror 140, protrusions can be provided on opposite edges of the conversation mirror 140, respectively, and guide grooves each receiving a respective protrusion can be provided in opposite sidewalls of the auxiliary space 112, respectively. With this configuration, the protrusions are stopped by the end of the grooves, thereby preventing the conversation mirror from being excessively exposed. As an alternative, the protrusions can be provided on the opposite sidewalls of the auxiliary space, respectively, and the guide grooves can be provided on the opposite edges of the conversation mirror, respectively.

Returning to FIGS. 2A through 3C, the operational state of the conversation minor and the cover will be described below. When the extension 122 of the cover 120 is pressed towards the roof, the fitting protrusion of the cover 120 is unfastened from the latch of the housing 110. This allows the cover 120 to pivot around the hinge pins 123 to a position where it can store sunglasses. After the sunglasses are stored, the cover 120 is pressed again towards the main space 111. Then, the fitting protrusion is fastened into the latch, and the cover 120 is fixed to the housing 110.

In addition, in order to use the conversation minor 140, the lower portion of the housing 110 is opened by pivoting the cover 120. Next, the fitting protrusion 141 of the conversation minor 140 is unfastened from the latch 130 by pressing the lower portion of the conversation minor 140 towards the latch part 130. The conversation minor 140 then moves out of the auxiliary space 112 under the elastic restoring force of the elastic member 150, thereby exposing itself.

The conversation minor 140 can be taken out in this fashion when a driver and/or a passenger need. When the use of the conversation minor 140 is completed, the lower portion of the conversation mirror 140 is pressed to retract the conversation minor 140 into the auxiliary space 112 and then fastening the fitting protrusion 141 into the latch part 130. When the conversation minor 140 is completely stored inside the auxiliary space 11, the lower portion of the housing 110 is closed by pressing the cover 120 towards the main space 111.

The lower end of the conversation minor 140 can be distanced from the inner surface of the extension 122 of the case 120 at a predetermined interval t such that the cover 120 does not contact the conversation minor 140 when the cover 120 is pivoted to open or close the main space 111 of the housing 110. Since the cover and the conversation minor are distanced from each other, they can operate separately.

According to an alternative embodiment of the present invention, the inner surface of the extension 122 of the cover 120 may contact the lower end of the conversation mirror 140 when the cover 120 opens or closes. When the cover 120 is pressed towards the main space 111 (i.e., upwards in FIG. 2B), the cover 120 also presses the conversation minor 140 so that the fitting protrusion 141 of the conversation mirror 141 is unfastened from the latch part 140. Then, the conversation mirror 140 is taken out from the auxiliary space 112 in response to pivoting of the cover 120. Accordingly, the conversation minor 140 can be exposed outside by one push action.

As set forth above, the auxiliary space is provided inside the housing by reducing the storage space for sunglasses, and the conversation mirror moving in the vertical direction is installed inside the auxiliary space. Accordingly, the storage spaces for both the conversation mirror and the sunglasses can be provided even in a limited layout of a small vehicle.

For convenience in explanation and accurate definition in the appended claims, the terms "upper" and "inner" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An overhead console provided on a front portion of an interior roof of a vehicle between a driver's seat and a seat next to the driver's seat, comprising:
   a conversation mirror providing a view of a rear vehicle or a backseat passenger, wherein the conversation mirror has a fitting protrusion formed on one end thereof;
   a housing having adjoining main and auxiliary spaces defined therein, wherein the auxiliary space releasably stores the conversation mirror;
   a cover pivotally coupled to the housing to open or close a lower portion of the main space, wherein the cover has a bucket to be selectively engaged to the main space to store sunglasses;
   a latch part provided in an upper portion of the auxiliary space, wherein the fitting protrusion of the conversation mirror is fastened into or unfastened from the latch part so that the conversation mirror is stored inside or released from the auxiliary space; and
   an elastic member having one end fixed in an upper portion of the auxiliary space and the other end thereof fixed to the conversation mirror, wherein the elastic member applies an elastic force in a direction to release the conversation mirror from the auxiliary space.

2. The overhead console in accordance with claim 1, wherein the cover has an extension extending towards the auxiliary space so as to open and close a lower portion of the auxiliary space.

3. The overhead console in accordance with claim 2, wherein an inner surface of the extension of the cover and a lower end of the conversation mirror are distanced from each other at a predetermined interval in a locking state so that the cover does not contact the conversation mirror when opening or closing a lower portion of the housing.

4. The overhead console in accordance with claim 2, wherein an inner surface of the extension of the cover and a lower end of the conversation mirror contact with each other in a locking state so that the cover and the conversation mirror are released from the housing concurrently.

5. The overhead console in accordance with claim 1, wherein
   the conversation mirror has protrusions formed on opposite edges thereof, respectively, and
   the auxiliary housing has grooves formed in opposite sidewalls thereof, respectively, wherein each of the grooves receives a corresponding one of the protrusions and guides movement of the corresponding protrusion.

* * * * *